(12) United States Patent
Notté et al.

(10) Patent No.: US 8,349,772 B2
(45) Date of Patent: Jan. 8, 2013

(54) METHOD OF SECONDARY OIL RECOVERY USING AN AMINOALKYLENE PHOSPHONIC ACID AND AN AMINE NEUTRALIZING AGENT

(75) Inventors: Patrick Notté, Wavre (BE); Albert Devaux, Mont-Saint-Gulbert (BE)

(73) Assignee: Dequest AG, Zug (CH)

( * ) Notice: Subject to any disclaimer, the term of this patent is extended or adjusted under 35 U.S.C. 154(b) by 0 days.

(21) Appl. No.: 13/001,110

(22) PCT Filed: Jul. 1, 2009

(86) PCT No.: PCT/EP2009/058289
§ 371 (c)(1),
(2), (4) Date: Feb. 9, 2011

(87) PCT Pub. No.: WO2010/000787
PCT Pub. Date: Jan. 7, 2010

(65) Prior Publication Data
US 2011/0130312 A1    Jun. 2, 2011

(30) Foreign Application Priority Data
Jul. 1, 2008 (EP) .................................... 08159427
Nov. 21, 2008 (EP) .................................... 08169650

(51) Int. Cl.
*C09K 8/528* (2006.01)

(52) U.S. Cl. ........ 507/236; 507/235; 507/237; 507/239; 507/244; 166/305.1

(58) Field of Classification Search .................. 507/236, 507/235, 237, 239, 244; 166/305.1
See application file for complete search history.

(56) References Cited

U.S. PATENT DOCUMENTS

| 3,532,167 | A | 10/1970 | Noe et al. |
|---|---|---|---|
| 3,943,059 | A | 3/1976 | Chiu |
| 4,079,006 | A | 3/1978 | Mitchell |
| 4,602,683 | A | 7/1986 | Meyers |
| 4,931,189 | A | 6/1990 | Dhawan et al. |
| 5,002,126 | A | 3/1991 | Carlberg et al. |
| 5,112,496 | A | 5/1992 | Dhawan et al. |
| 6,071,434 | A * | 6/2000 | Davis et al. ................. 252/389.2 |
| 2002/0094299 | A1 | 7/2002 | Nguyen et al. |
| 2007/0215347 | A1* | 9/2007 | Tang ............................ 166/263 |

FOREIGN PATENT DOCUMENTS

| EP | 0861846 | A2 | 9/1998 |
|---|---|---|---|
| EP | 0800613 | B1 | 10/2001 |
| EP | 1240407 | B1 | 12/2003 |
| EP | 1886976 | A1 | 2/2008 |
| GB | 2306465 | A | 5/1997 |

OTHER PUBLICATIONS

Uniqema, The HLB System—A Time Saving Guide to Surfactant Selection, Presentation to the Midwest Chapter of the Society of Cosmetic Chemists, Mar. 9, 2004.

* cited by examiner

*Primary Examiner* — Alicia Toscano

(74) *Attorney, Agent, or Firm* — Husch Blackwell LLP

(57) ABSTRACT

A method of secondary oil recovery is disclosed wherein from 0.1 to 100 000 ppm of a medium soluble aminoalkylene phosphonic acid amine salt are used wherein both the aminoalkylene phosphonic acid moiety and the amine moiety are selected from a specifically defined class of compounds. The substantially medium soluble aminoalkylene amine phosphonates exhibit a significantly improved compatibility with the recovery medium and thus can propagate fairly freely into the medium and consequently cover a largely extended rock surface before being subject to precipitation in the form of a medium insoluble scale inhibitor. The amine compound is represented by combinations of structurally different compounds.

11 Claims, No Drawings

METHOD OF SECONDARY OIL RECOVERY USING AN AMINOALKYLENE PHOSPHONIC ACID AND AN AMINE NEUTRALIZING AGENT

CROSS REFERENCE TO RELATED APPLICATIONS

This application is a U.S. National Phase Application of International Application PCT Application No. PCT/EP2009/058289, filed on Jul. 1, 2009, which claims the benefit of priority from European Patent Application No. 08169650.2, filed on Nov. 21, 2008, and European Patent Application No. 08159427.7 filed on Jul. 1, 2008. The disclosures of International Application PCT Application No. PCT/EP2009/058289, European Application 08169650.2, and European Application 08159427.7 are incorporated herein by reference.

This invention pertains to an improved method of secondary oil recovery. In particular, a method for an improved deployment of scale inhibitor during secondary oil recovery is described. In detail, an aminoalkylene phosphonic acid amine salt scale inhibitor is used to thus yield significantly enlarged coverage of rock surface area onto which the aminoalkylene phosphonate inhibitor can diffuse and deposit before being converted, in situ, into an effective medium insoluble scale inhibitor such as alkaline-earth metal salts of the amino alkylene phosphonates. The amino alkylene phosphonic acid amine salt has a significantly improved compatibility with the secondary oil recovery medium and thus can propagate fairly freely into the medium to consequently cover a largely extended rock surface before being subject to precipitation in the form of an insoluble salt capable of exhibiting desirable scale inhibitor performance. The aminoalkylene phosphonic acid amine salt addition can be performed continuously by injecting an aqueous solution of the amine phosphonate into the water injection well and/or into the surroundings of the production well such as the well head arrangement and under-water equipment. The amine phosphonate can also be injected, in a known manner, into the production well. Whatever known method is selected, the benefits are substantial and economically important. The aminoalkylene phosphonic acid amine salts are used in the selected method in levels conventional in the domain of the technology.

Secondary oil recovery has been a major industrial activity for a long time and, as one could expect, significant efforts have been invested with a view to optimizing oil recovery. The efficiency of marine oil recovery is known to be subject to insufficient rock control, particularly from a scale inhibitor adsorption/release standpoint.

EP 0 800 613 B1 describes a system for stimulating the oil production in oil wells. To that effect, an acid phosphonate system is used to improve the penetration of the system adjacent to the well-bore. EP 0 861 846 A2 describes a class of phosphino derivatives which are useful for scale inhibition in oil wells and show enhanced adsorption to rocks. EP 1 240 407 B1 discloses a process for treating subterranean oil wells by injecting a mixture of an oil field chemical and an oil soluble surfactant. U.S. Pat. No. 4,602,683A pertains to a method of inhibiting scale in wells via the use of amine phosphonates such as ethylene diamine tetra(methylene phosphonic acid) and hexamethylene diamine tetra(methylene phosphonic acid).

U.S. Pat. No. 4,602,683 describes a method of inhibiting scale in wells. In detail, a scale inhibitor having a solubility that significantly decreases with decreasing pH is injected into the subsurface formation adjacent to the well followed by lowering the pH to thus precipitate the inhibitor. Preferred scale inhibitors include aminophosphonates of the DEQUEST series. EP 0 861 846 discloses telomers comprising phosphonate and/or phosphonate groups which telomers are effective scale inhibitors with good adsorption properties. The telomers show improved adsorption onto mineral surfaces, good thermal stability and barium scale inhibition. The water-soluble salts are alkali metal or ammonium salts. EP 1 240 407 pertains to a method of treating a subterranean oil well by injecting down a well bore a scale inhibitor such as hydroxyl of aminophosphonic or sulfonic acids.

U.S. Pat. No. 4,602,683 concerns a method of inhibiting scale in wells whereby an inhibitor solution is injected at a higher first pH into a subsurface brine producing formation followed by subjecting the scale inhibitor solution to a lower second pH thereby causing precipitation of the scale inhibitor in the formation. U.S. Pat. No. 5,002,126 describes scale inhibition in a non-carbonate subterranean reservoir by injecting into the reservoir a water-soluble surfactant metal salt and thereafter an inhibitor selected from phosphonates and polymeric carbonates. The inhibitor reacts with the metal to thus precipitate and slowly dissolves in production water to inhibit scale formation. US 2002/0094299 pertains to method of preventing scaling involving a composition containing at least one of polyvalent metal silicate and polyvalent metal carbonate and at least one protein.

It is a main object of this invention to provide an improved method of secondary oil recovery. It is another object of this invention to generate, from an effective oil recovery standpoint, longer lasting recovery well structures. Yet another object of this invention aims at injecting into the reservoir system, specifically into the well medium, compatible/soluble scale inhibitors to thus deposit, in increased proportions onto the extended rock surfaces before being converted into insoluble scale inhibitors capable of providing timely extended inhibitor functionality. Yet another object of this invention aims at mitigating, from an environmental standpoint, inhibitor inconveniences attached to secondary oil recovery operations.

The term "reservoir system" as used herein comprises the actual oil reservoir, the water injection well, the production well and any part of the recovery equipment, such as pumps, pipes and transfer lines for water injection and recovery of the oil.

The term "secondary oil recovery" as used herein comprises classical secondary recovery methods but also tertiary and enhanced oil recovery methods where chemicals are added to improve the efficiency of water flooding.

The term "percent" or "%" as used throughout this application stands, unless defined differently, for "percent by weight" or "% by weight". The terms "phosphonic acid" and "phosphonate" are also used interchangeably depending, of course, upon medium prevailing alkalinity/acidity conditions. The term "ppm" stands for "parts per million". Suitable amino acids can be used in their D; D,L; and L forms; as well as mixtures of the D and L forms.

The above and other objects can now be met by using the method in accordance with the invention herein, namely the beneficial use of amine neutralized aminoalkylene phosphonates. In more detail, the method of this invention comprises the step of injecting into a reservoir system of from 0.1 ppm to 100 000 ppm of an aminoalkylene phosphonic acid having the general formula:

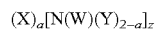

wherein X is selected from $C_1$-$C_{200000}$, preferably $C_1$-$C_{50000}$, most preferably $C_1$-$C_{2000}$, linear, branched, cyclic or aromatic hydrocarbon radicals, optionally substituted by one or more $C_1$-$C_{12}$ linear, branched, cyclic or aromatic groups (which radicals and/or which groups can be) optionally substituted by OH, COOH, COOG, F, Br, Cl, I, OG, $SO_3H$, $SO_3G$ and SG moieties; $ZPO_3M_2$; $[V-N(K)]_n-K$; $[V-N(Y)]_n-V$ or $[V-O]_x-V$; wherein V is selected from: a $C_{2-50}$ linear, branched, cyclic or aromatic hydrocarbon radical, optionally substituted by one or more $C_{1-12}$ linear, branched, cyclic or aromatic groups (which radicals and/or groups are) optionally substituted by OH, COOH, COOR', F/Br/Cl/I, OR', $SO_3H$, $SO_3R'$ or SR' moieties wherein R' is a $C_{1-12}$ linear, branched, cyclic or aromatic hydrocarbon radical; wherein G is selected from $C_1$-$C_{200000}$, preferably $C_1$-$C_{50000}$, most preferably $C_1$-$C_{2000}$, linear, branched, cyclic or aromatic hydrocarbon radicals, optionally substituted by one or more $C_1$-$C_{12}$ linear, branched, cyclic or aromatic groups (which radicals and/or which groups can be) optionally substituted by OH, COOH, COOR', F, Br, Cl, I, OR', $SO_3H$, $SO_3R'$ and SR' moieties; $ZPO_3M_2$; $[V-N(K)]_n-K$; $[V-N(Y)]_n-V$ or $[V-O]_x-V$; wherein Y is $ZPO_3M_2$, $[V-N(K)]_n-K$ or $[V-N(K)]_n-V$; and x is an integer from 1-50000, z is from 0-200000 whereby z is equal to or smaller than the number of carbon atoms in X, and a is 0 or 1; n is an integer from 0 to 50000; z=1 when a=0; and X is $[V-N(K)]_n-K$ or $[V-N(Y)]_n-V$ when z=0 and a=1;

Z is a $C_{1-6}$ alkylene chain;

M is H;

W is selected from H, X and $ZPO_3M_2$;

K is $ZPO_3M_2$ or H whereby K is $ZPO_3M_2$ when z=0 and a=1 or when W is H or X;

with the proviso that the aminoalkylene phosphonic acid contains, at least, two phosphonic acid groups;

in combination with an amine neutralizing agent having the formula:

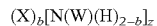

wherein X is selected from $C_1$-$C_{200000}$, preferably $C_{1-50000}$, most preferably $C_{1-2000}$, linear, branched, cyclic or aromatic hydrocarbon radicals, optionally substituted by one or more $C_1$-$C_{12}$ linear, branched, cyclic or aromatic groups (which radicals and/or which groups can be) optionally substituted by OH, COOH, COOG, F, Br, Cl, I, OG, $SO_3H$, $SO_3G$ and SG moieties; H; $[V-N(H)_x]_x-H$ or $[V-N(Y)]_n-V$ or $[V-O]_x-V$; wherein V is selected from: a $C_{2-50}$ linear, branched, cyclic or aromatic hydrocarbon radical, optionally substituted by one or more $C_{1-12}$ linear, branched, cyclic or aromatic groups (which radicals and/or groups are) optionally substituted by OH, COOH, COOR', F/Br/Cl/I, OR', $SO_3H$, $SO_3R'$ or SR' moieties wherein R' is a $C_{1-12}$ linear, branched, cyclic or aromatic hydrocarbon radical; wherein G is selected from $C_1$-$C_{200000}$, preferably $C_1$-$C_{50000}$, most preferably $C_1$-$C_{2000}$, linear, branched, cyclic or aromatic hydrocarbon radicals, optionally substituted by one or more $C_1$-$C_{12}$ linear, branched, cyclic or aromatic groups (which radicals and/or which groups can be) optionally substituted by OH, COOH, COOR', F, Br, Cl, I, OR', $SO_3H$, $SO_3R'$ and SR' moieties; H; $[V-N(H)]_n-H$; $[V-N(Y)]_n-V$ or $[V-O]_x-V$; wherein Y is H, $[V-N(H)]_n-H$ or $[V-N(H)]_n-V$ and x is an integer from 1-50000; n is an integer from 0 to 50000; z is from 0-200000 whereby z is equal to or smaller than the number of carbon atoms in X, and b is 0, 1 or 2; z=1 when b=0; and X is $[V-N(H)]_x-H$ or $[V-N(Y)]_n-V$ when z=0 and b=1; with W different from H when X=H;

W is selected from H and X, whereby the molar ratio of the aminoalkylene phosphonic acid multiplied by the number of phosphonic acid moieties in the phosphonic acid to the molar ratio of amine multiplied by the number of N in the amine is from:

1:0.25 to 1:1, preferably from 1:0.5 to 1:0.8, in one particular embodiment from 1:0.6 to 1:0.75.

From the above ratios it is evident that the amino neutralizing agent most be selected to comprise at least one amino group. Preferably the proviso applies that the amine neutralizing agent is represented by a combination of, at least, two structurally different amine species, the first one being more hydrophobic having a HLB value which is at least 2 units smaller than the HLB value of the second, and the second one being more hydrophilic than the first one, said first and said second amine species being used in equivalent proportions of first (more hydrophobic) : second (more hydrophilic) in the range of from 10:1 to 2:5.

In the following, the term "amine neutralizing agent" in all cases embraces the preferred combination of at least two structurally different amine species according to the proviso.

Further provided is the use of the above combination in secondary oil recovery, preferably for inhibiting scaling, and in particular to thereby deposit onto a significantly extended rock surface area onto which the aminoalkylene phosphonate will diffuse before being converted, in situ, into the corresponding medium insoluble scale inhibitor which by means of gradual release into the medium will provide for a continuous supply of scale inhibitor in the exploitation system.

M, in the meaning of the aminoalkylene phosphonic acid, is generally and predominantly H, and can be represented by minor levels of alkali and/or alkaline-earth ions with the proviso that the percentage of free P—OH in the phosphonate product to be injected preferably represents less than 90%, more preferably less than 80%, in particular less than 70%, of the total P—OH functionalities (100%) in the non-neutralized phosphonic acid.

In preferred phosphonates herein, X or Y are different from $ZPO_3M_2$ when W is $ZPO_3M_2$. In another preferred execution X is $[V-N(K)]_x-K$ or $[V-N(Y)]_n-V$, with V being a $C_{2-4}$ linear or branched hydrocarbon radical when z=0 and a=1. In yet another preference, W and K are $ZPO_3M_2$ when X is $[V-O]_x-V$. In other preferred executions, z is equal to or smaller than half the number of carbon atoms in X. In another preference W and Y are $[V-N(K)]_x-K$ or $[V-N(Y)]_n-V$ when X is a $C_1$ to $C_{50}$ alkyl chain substituted by COOH, COOG, $SO_3H$, $SO_3G$, OG, SG, OH, F, Br, Cl or I groups.

The HLB (Hydrophile/Lipophile/Balance) system and the calculation of the individual HLB values of amine neutralizing species are based on the criteria set forth in:

"The HLB System", "Presentation to the Midwest Chapter of the Society of Cosmetic Chemists, Mar. 9, 2004, UNIQUEMA".

The HLB scale goes from 0 to 20. The HLB value of a compound is derived from the hydrophilic portion of the compound, on its molecular weight and then dividing that number by 5.

The term "structurally different" with respect to the amine neutralizing agent means that the individual amine species have different molecular weights.

The amine neutralizing agent is preferably used in neutralizing levels, in relation to the phosphonic acid component, thereby considering the required pH of the technology, including the type of phosphonate. It goes without saying that co-neutralizing agents such as alkaline and alkaline-earth metal hydroxides can be used. The degree of neutralizing activity of the essential amine component, in relation to the phosphonic acid group, can be expressed by means of the pH of a 1% aqueous solution at 20° C. of the neutralized product. For an amino alkylene phosphonic acid this value is at least 1, preferably from 1.5 to 8.5, in one particular execution from 2 to 8. The amine-neutralized phosphonate component can also be prepared individually and as such i.e. as a solution or as a solid added to the claimed arrangement.

The first and second amine species are preferably used in equivalent ratios (more hydrophobic:more hydrophilic) of from:

10:1 to 2:5; particularly from 10:3 to 1:2.

The term "equivalent ratio" represents the number of moles of the more hydrophobic amine multiplied by the number of amino groups present in that molecule divided by the number of moles of the more hydrophilic amine multiplied by the number of amino groups present in that molecule.

The terms "more hydrophilic" and "more hydrophobic" can, inter alia, also be defined by means of the chemical structures. Alkylene amines, alkylamines and arylamines used in combination with the second species, in the ponderal proportions set forth above, are more hydrophobic, in the meaning of the invention herein, than species from the group of alkoxyamines, and alkanolamines.

Examples of the HLB values of amine neutralizing agents for use herein are as follows:

| | |
|---|---|
| isopropylamine | 5.41 |
| di-n-butylamine | 2.47 |
| tri-n-butylamine | 1.72 |
| cyclohexylamine | 3.22 |
| 1,2-diaminocyclohexane | 5.60 |
| stearylamine | 1.18 |
| tridecaneoxyethylethanolamine | 7.24 |
| nonylphenyldodeca(oxyethyl)ethanolamine | 14.47 |
| laurylamine | 1.73 |

In one particular execution herein, the first, more hydrophobic, amine neutralizing species has a HLB value which is, at least, 4 units, smaller than the HLB value of the second more hydrophilic species. In one preferred aspect herein, the HLB value of the first (more hydrophobic) species is smaller than 6. The HLB values of mixtures or of either one of the first or the second species can be determined in accordance with the UNIQUEMA paper.

In a further preferred embodiment the binary amine species, expressed in mole(s), are selected from combinations as follows:

| | |
|---|---|
| isopropylamine/tri-n-butylamine | 3/2; |
| 1,2-diaminocyclohexane/stearylamine | 0.95/1.10; |
| diethanolamine/dodecylamine | 2/5.5; |
| cyclohexylamine/tridecaneoxyethylethanolamine | 3/2.5; |
| ethanolamine/laurylamine | 2/4; and |
| triethanolamine/tri-n-butylamine | 2/10. |

It was established that aminotri(methylene phosphonic acid) has, upon injection with sea water, a lower compatibility with Ca-carbonate which can severely limit efficient deployment. The medium insoluble scale inhibitor is frequently represented by the calcium salt.

The essential amine component needed to neutralize the phosphonic acids can be represented by a wide variety of known species. Examples of preferred amines include:

alkyl amines; alkylene amines; alkoxy amines; halogen substituted alkyl amines; aryl amines; and alkanol amines. It is understood that poly species are embraced. As an example, the term "alkyl amines" also includes -polyalkyl amines-, -alkyl polyamines- and -polyalkyl polyamines-.

Individual species of amines of interest include: ethylene diamine; diethylene triamine; triethylene tetramine; tetraethylene pentamine; hexamethylene diamine; dihexamethylene triamine; 1,3-propane diamine N,N'-bis(2-amino ethyl); polyether amine; polyether polyamines; amine and poly amine alkoxylates or polyalkoxylates like cocodiamine ethoxylate; 2-chloroethyl amine; 3-chloropropyl amine; 4-chlorobutyl amine; poly-amines with $C_1$-$C_{50}$ linear or branched or cyclic hydrocarbon radicals, in particular morpholine, n-butylamine; isopropyl amine; diisopropyl amine; di-n-butylamine; tri-n-butylamine; tri-isobutyl amine; cyclohexyl amine; cycloheptylamine; cyclododecylamine; 4-methylcyclohexylamine, N,N-dimethylcyclohexylamine; 1,2-cyclohexane diamine and isophoron diamine; laurylamine; stearyl amine and oleyl amine; polyvinyl amines; polyethylene imines, mixtures of branched and/or linear polyethylene imines; ethanolamine; diethanolamine; propanolamine; and dipropanol amine. Aromatic amines can be represented by aniline; diaminotoluenes; diphenylalanine; N-phenylbenzamine. Commercially available fatty amines with a chain length from $C_6$-$C_{22}$ such as hydrogenated tallow alkyl amine; cocoalkyl amine and soyaalkylamine are also examples of preferred species.

Preferred species of the aminoalkylene phosphonic acids are: ethylene diamine tetra(methylene phosphonic acid); diethylenetriamine penta(methylene phosphonic acid); 1,3-propane diamine-N,N'-bis(2-aminoethyl)hexa(methylene phosphonic acid); L-lysine N,N,N',N'-tetra(methylene phosphonic acid); L-alanine-N,N-di(methylene phosphonic acid); propyl or ethyl imino bis(methylene phosphonic acid) substituted polyethylene imine; glycine N,N-bis(propyl or ethyl imino bis(methylene phosphonic acid)); alanine N,N-bis(propyl or ethyl imino bis(methylene phosphonic acid)); β-alanine N,N-bis(propyl or ethyl imino bis(methylene phosphonic acid)); glutamic acid N,N-bis(propyl or ethyl imino bis(methylene phosphonic acid)); 4-aminomethyl 1,8-octane diamino hexa(methylene phosphonic acid); 6-amino hexanoic acid N,N-bis(propyl or ethyl imino bis(methylene phosphonic acid)); 9-amino nonanoic acid N,N-bis(propyl or ethyl imino bis(methylene phosphonic acid)); 11-amino undecanoic acid N,N-bis(propyl or ethyl imino bis(methylene phosphonic acid)); 12-amino dodecanoic acid N,N-bis(propyl or ethyl imino bis(methylene phosphonic acid)); and poly(vinylamino bis(methylene phosphonic acid)); and poly(vinylamino N,N-bis(propyl or ethyl imino bis(methylene phosphonic acid))).

Other preferred species include: 4-amino butanoic acid N,N-bis(propyl or ethyl imino bis(methylene phosphonic acid)); methionine N,N-bis(propyl or ethyl imino bis(methylene phosphonic acid)); L-lysine N,N,N',N'-tetra(propyl or ethyl imino bis(methylene phosphonic acid)); aspartic acid N,N-bis(propyl or ethyl imino bis(methylene phosphonic acid)); phenylalanine N,N-bis(propyl or ethyl imino bis(methylene phosphonic acid)); threonine N,N-bis(propyl or ethyl imino bis(methylene phosphonic acid)); 2-ethanol amine N,N-bis(propyl or ethyl imino bis(methylene phosphonic acid)); 6-hexanol amine N,N-bis(propyl or ethyl imino bis(methylene phosphonic acid)); 4-butanol amine N,N-bis(propyl or ethyl imino bis(methylene phosphonic acid)); di(2-ethanol)amine(propyl or ethyl imino bis(methylene phosphonic acid)); dipropanol amine (propyl or ethyl imino bis(methylene phosphonic acid)); 2-(2-aminoethoxy) ethanol bis(propyl or ethyl imino bis(methylene phosphonic acid)); 3-propanol amine bis(propyl or ethyl imino bis(methylene phosphonic acid)); toluene diamine tetra(propyl or ethyl imino bis(methylene phosphonic acid)); 1,6-hexamethylene diamine tetra(propyl or ethyl imino bis(methylene phosphonic acid)); 1,4-butane diamine tetra(propyl or ethyl imino bis(methylene phosphonic acid)); 1,2-ethylene diamine tetra(propyl or ethyl imino bis(methylene phosphonic acid)); linear or branched polyethylene imine poly(propyl or ethyl imino bis(methylene phosphonic acid)); methyl or ethyl or propyl or butyl or hexyl or heptyl or octyl or nonyl or decyl or dodecyl amine bis(propyl or ethyl imino bis(methylene phosphonic acid)); aniline bis(propyl or ethyl imino bis(methylene phosphonic acid)); $C_{12-22}$ fatty amine bis(propyl or ethyl imino bis(methylene phosphonic acid)); thioglycolic acid S-(propyl or ethyl imino bis(methylene phosphonic acid)); cysteine S,N,N-tri(ethyl or propyl imino bis(methylene phosphonic acid)); methyl(propyl or ethyl imino bis(methylene phosphonic acid)) thioether; ethyl or propyl or pentyl or hexyl or octyl or phenyl or naphthyl or decyl or dodecyl (propyl or ethyl imino bis(methylene phosphonic acid)) thioether; propanoic acid 3-oxy(propyl or ethyl imino bis (methylene phosphonic acid)); butanoic acid 4-oxy(propyl or ethyl imino bis(methylene phosphonic acid)); pentanoic acid 5-oxy(propyl or ethyl imino bis(methylene phosphonic acid)); acetic acid 2-oxy(propyl or ethyl imino bis(methylene phosphonic acid)); tartaric acid O,O'-bis(propyl or ethyl imino bis(methylene phosphonic acid)); hydroxysuccinic acid O-(propyl or ethyl imino bis(methylene phosphonic acid)); butyric acid α-oxy-(propyl or ethyl imino bis(methylene phosphonic acid)).

Scale formation, such as carbonate and sulphate scales, can be a major problem in oil field production facilities that can result in a significant well productivity decline. This can, in particular, apply when sea water is injected into the oil bearing formation to compensate e.g. for a loss in gas pressure. As a result of the presence of important quantities of barium, strontium and calcium ions in the down-hole formation water mainly barium sulphate and strontium sulphate and to a lesser degree calcium sulphate can become a major problem in the operation of the well, inter alia because of scale formation. Whereas sulphate scales prevail upon seawater injection during the enhanced oil recovery treatment, milder pH conditions, prevailing closer to the surface, pressure differences and high temperatures in the down-hole formation usually lead to the formation of mixtures of carbonate and sulphate scales. The scale inhibitors shall therefore exhibit performance over a broad range of conditions such as can occur in the oil wells and production facilities. The inhibitor can be introduced into the oil bearing formation by any suitable treatment including a "squeeze" treatment. In general such a method for oil recovery requires injecting into a marine oil well an aqueous solution of the phosphonic acid scale inhibitor of this invention in a usual level of from 0.1 to 100000 ppm. Frequently, the production oil well activity is stopped and the inhibitor solution is injected into the oil well formation. It was established that the scale inhibitors in accordance with this invention can be used effectively and singly. The squeeze treatment generally consists of injecting a scale inhibitor solution into the well bore of the producing well to place the inhibitor into the formation. The scale inhibitor released from the formation is present, in the return water, in a concentration of, at least, 0.1, usually at least 0.5, frequently from 10 to 100 ppm to thus exhibit effective scale control and consequently secure oil well production continuity.

In more detail, a beneficial method for oil recovery can be done by injecting into marine oil wells an aqueous solution of the phosphonic acid compound of the invention in a level of from 0.1 to 100000 ppm. The method can be conducted by continuously injecting into the well an aqueous solution of from 0.1 to 800 ppm of the phosphonic acid compound. The continuous injection frequently means that the scale inhibitor solution is injected into the water injection well. However, it is understood that the continuous injection can also apply to the surroundings of the production well such as the well-head arrangement including under-water equipment for example pumps and pipes. The scale inhibitors of this invention can also be used in squeeze oil recovery methods. Such squeeze method comprises, in sequence: stopping the production well bore activity; introducing through the production well-bore the aqueous treatment solution containing the phosphonic acid scale inhibitor in a level of from 100 to 100000 ppm; injecting sea water through the production well-bore to place the scale inhibitor within the targeted area of the formation; restarting the oil extraction activity; and producing return fluids, containing oil and return water, through the production well-bore.

The use of the technology in accordance with the invention herein was found to exhibit economically significant benefits including a more uniform squeeze, extended production periods between successive squeezes as well as a more uniform distribution and efficient use of the injected scale inhibitor. The technology can be used advantageously in e.g. sub-terranean carbonated and non-carbonated rock formations. The treatment of non-carbonated rock formations can require the presence of a water-soluble surfactant metal salt, containing preferably a terminal metal ion which is adsorbed on the surface of the reservoir followed by injecting the amine phosphonate inhibitor of this invention. The well can also be subjected to various other known activation treatments. In yet another approach the well can be treated by what is known as an adsorption squeeze whereby the scale inhibitor is deposited onto the well surface.

Irrespective of which technology is used, the method herein yields significantly enhanced surface distribution for the scale inhibitor. The phosphonate amine salts of this invention were found to show improved partition in favour of the oil phase of the oil-water system, compared to the partition of the state-of-the-art scale inhibitors upon use in a similar system. In the latter event the art scale inhibitors show improved partition largely in favour of the aqueous phase. The phosphonate amine salts herein can therefore be more homogeneously distributed over an enlarged reservoir rock area, i.e. a significantly extended rock surface area, providing desirable benefits both in the event of sea water injection and in the squeeze application. The inhibitor can consequently cover a significantly greater surface before being adsorbed onto the rocks and converted into a water-insoluble inhibitor which can be slowly released into the water during the pumping operation. So proceeding can yield significant advantages including extended production periods between successive squeezes and a more efficient use of the scale inhibitor.

The amine neutralized scale inhibitor used herein also serves, due to its more favourable partition in the oil phase, for controlling and avoiding cumbersome naphthenic scale built up originating in the oil phase. The inventive technology can also be used beneficially to mitigate and avoid the precipitation of hydrocarbon hydrates at lower temperatures. Such adverse hydrocarbon hydrate precipitation can occur in various parts surrounding the oil well, in particular in pipes and transfer lines. Presently large amounts of additives such as mono ethylene glycol are used to prevent and inhibit non-desirable hydrocarbon hydrate crystallization.

The invention claimed is:

1. A method of secondary oil recovery comprising the step of injecting into the reservoir system of from 0.1 ppm to 100 000 ppm of an aminoalkylene phosphonic acid selected from the group consisting of:

ethylene diamine tetramethylene phosphonic acid; diethylenetriamine pentamethylene phosphonic acid; 1,3-propane diamine-N,N'-bis2-aminoethylhexamethylene phosphonic acid; L-lysine-N,N,N',N'-tetramethylene phosphonic acid; L-alanine-N,N-dimethylene phosphonic acid; propyl imino bismethylene phosphonic acid substituted polyethylene imine; ethyl imino bismethylene phosphonic acid substituted polyethylene imine; glycine N,N-bispropyl imino bismethylene phosphonic acid; glycine N,N-bisethyl imino bismethylene phosphonic acid; alanine N,N-bispropyl imino bismethylene phosphonic acid; alanine N,N-bisethyl imino bismethylene phosphonic acid; β-alanine N,N-bispropyl imino bismethylene phosphonic acid; β-alanine N,N-bisethyl imino bismethylene phosphonic acid; glutamic acid N,N-bispropyl imino bismethylene phosphonic acid; glutamic acid N,N-bisethyl imino bismethylene phosphonic acid; 4-aminomethyl 1,8-octane diamino hexamethylene phosphonic acid; 6-amino hexanoic acid N,N-bispropyl imino bismethylene phosophonic acid; 6-amino hexanoic acid N,N-bisethyl imino bismethylene phosophonic acid; 9-amino nonanoic acid N,N-bispropyl imino bismethylene phosphonic acid; 9-amino nonanoic acid N,N-bisethyl imino bismethylene phosphonic acid; 11-amino undecanoic acid N,N-bispropyl imino bismethylene phosphonic acid; 11-amino undecanoic acid N,N-bisethyl imino bismethylene phosphonic acid; polyvinylamino N,N-bispropyl imino bismethylene phosphonic acid; polyvinylamino N,N-bisethyl imino bismethylene phosphonic acid; 12-amino dodecanoic acid N,N-bispropyl imino bismethylene phosphonic acid; 12-amino dodecanoic acid N,N-bisethyl imino bismethylene phosphonic acid; polyvinylamino bismethylene phosphonic acid, 4-amino butanoic acid N,N-bispropyl imino bismethylene phosphonic acid; 4-amino butanoic acid N,N-bisethyl imino bismethylene phosphonic acid; methionine N,N-bispropyl imino bismethylene phosphonic acid; methionine N,N-bisethyl imino bismethylene phosphonic acid; L-lysine N,N,N',N'-tetra-propyl imino bismethylene phosphonic acid; L-lysine N,N,N',N'-tetra-ethyl imino bismethylene phosphonic acid; aspartic acid N,N-bispropyl imino bismethylene phosphonic acid; aspartic acid N,N-bisethyl imino bismethylene phosphonic acid; phenylalanine N,N-bispropyl imino bismethylene phosphonic acid; phenylalanine N,N-bisethyl imino bismethylene phosphonic acid; threonine N,N-bispropyl imino bismethylene phosphonic acid; threonine N,N-bisethyl imino bismethylene phosphonic acid; 2-ethanol amine N,N-bispropyl imino bismethylene phosphonic acid; 2-ethanol amine N,N-bisethyl imino bismethylene phosphonic acid; 6-hexanol amine N,N-bispropyl imino bismethylene phosphonic acid; 6-hexanol amine N,N-bisethyl imino bismethylene phosphonic acid; 4-butanol amine N,N-bispropyl imino bismethylene phosphonic acid; 4-butanol amine N,N-bisethyl imino bismethylene phosphonic acid; di2-ethanolaminepropyl imino bismethylene phosphonic acid; di2-ethanolamineethyl imino bismethylene phosphonic acid; dipropanol aminepropyl imino bismethylene phosphonic acid; dipropanol amineethyl imino bismethylene phosphonic acid; 2-2-aminoethoxyethanol bispropyl imino bismethylene phosphonic acid; 2-2-aminoethoxyethanol bisethyl imino bismethylene phosphonic acid; 3-propanol amine bispropyl imino bismethylene phosphonic acid; 3-propanol amine bisethyl imino bismethylene phosphonic acid; toluene diamine tetrapropyl imino bismethylene phosphonic acid; toluene diamine tetraethyl imino bismethylene phosphonic acid; 1,6-hexamethylene diamine tetrapropyl imino bismethylene phosphonic acid; 1,6-hexamethylene diamine tetraethyl imino bismethylene phosphonic acid; 1,4-butane diamine tetrapropyl imino bismethylene phosphonic acid; 1,4-butane diamine tetraethyl imino bismethylene phosphonic acid; 1,2-ethylene diamine tetrapropyl imino bismethylene phosphonic acid; 1,2-ethylene diamine tetraethyl imino bismethylene phosphonic acid; linear or branched polyethylene imine polypropyl imino bismethylene phosphonic acid; linear or branched polyethylene imine polyethyl imino bismethylene phosphonic acid; methyl or ethyl or propyl or butyl or hexyl or heptyl or octyl or nonyl or decyl or dodecyl amine bispropyl imino bismethylene phosphonic acid; methyl or ethyl or propyl or butyl or hexyl or heptyl or octyl or nonyl or decyl or dodecyl amine bisethyl imino bismethylene phosphonic acid; aniline bispropyl imino bismethylene phosphonic acid; aniline bisethyl imino bismethylene phosphonic acid; $C_{12-22}$ fatty amine bispropyl imino bismethylene phosphonic acid; $C_{12-22}$ fatty amine bisethyl imino bismethylene phosphonic acid; thioglycolic acid S-propyl imino bismethylene phosphonic acid; thioglycolic acid S-ethyl imino bismethylene phosphonic acid; cysteine S,N,N-triethyl imino bismethylene phosphonic acid; cysteine S,N,N-tripropyl imino bismethylene phosphonic acid; methylpropyl imino bismethylene phosphonic acid thioether; methylethyl imino bismethylene phosphonic acid thioether; ethyl or propyl or pentyl or hexyl or octyl or phenyl or naphthyl or decyl or dodecylpropyl imino bismethylene phosphonic acid thioether; ethyl or propyl or pentyl or hexyl or octyl or phenyl or naphthyl or decyl or dodecylethyl imino bismethylene phosphonic acid thioether; propanoic acid 3-oxypropyl imino his methylene phosphonic acid; propanoic acid 3-oxyethyl imino his methylene phosphonic acid; butanoic acid 4-oxypropyl imino bismethylene phosphonic acid; butanoic acid 4-oxyethyl imino bismethylene phosphonic acid; pentanoic acid 5-oxypropyl imino bismethylene phosphonic acid; pentanoic acid 5-oxyethyl imino bismethylene phosphonic acid; acetic acid 2-oxypropyl imino bismethylene phosphonic acid; ; acetic acid 2-oxyethyl imino bismethylene phosphonic acid; tartaric acid O,O'-bispropyl imino bismethylene phosphonic acid; tartaric acid O,O'-bisethyl imino bismethylene phosphonic acid; hydroxysuccinic acid O-propyl imino bismethylene phosphonic acid; hydroxysuccinic acid O-ethyl imino bismethylene phosphonic acid; butyric acid a-oxy-propyl imino bismethylene phosphonic acid and butyric acid a-oxy-ethyl imino bismethylene phosphonic acid in combination with an amine neutralizing agent having the formula:

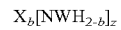

$X_b[NWH_{2-b}]_z$ wherein X is selected from the group consisting of $C_1$-$C_{200000}$ linear, branched, cyclic or aromatic hydrocarbon radicals, optionally substituted by one or more $C_1$-$C_{12}$ linear, branched, cyclic or aromatic groups which radicals and/or which groups can be optionally substituted by OH, COOH, COOG, F, Br, Cl, I, OG, $SO_3H$, $SO_3G$ and SG moieties; H; $[V-NH]_x$—H or $[V-NY_n$—V or $[V-O]_x$—V; wherein V is selected from the group consisting of a $C_{2-50}$ linear, branched, cyclic or aromatic hydrocarbon radical, optionally substituted by one or more $C_{1-12}$ linear, branched, cyclic or aromatic groups which radicals and/or groups are optionally substituted by OH, COOH, COOR', F/Br/Cl/I, OR', SO$_3$H, SO$_3$R' or SR' moieties wherein R' is a C$_{1-12}$ linear, branched, cyclic or aromatic hydrocarbon radical; wherein G is selected from the group consisting of C$_1$-C$_{200000}$, linear, branched, cyclic or aromatic hydrocarbon radicals, optionally substituted by one or more C$_1$-C$_{12}$ linear, branched, cyclic or aromatic groups which radicals and/or which groups can be optionally substituted by OH, COOH, COOR', F, Br, Cl, I, OR', SO$_3$H, SO$_3$R' and SR' moieties; H; [V—NH]$_n$—H: [V—NY]$_n$—V or [V—O]$_x$,—V; wherein Y is H, [V—NH]$_n$—H or [V—NH]$_n$—V and x is an integer from 1-50000, n is an integer from 0 to 50000; z is from 0-200000 whereby z is equal to or smaller than the number of carbon atoms in X, and b is 0, 1 or 2; z=1 when b=0; and X is [V—NH]$_x$—H or [V—NY]$_n$—V when z=0 and b=1; with W different from H when X=H: W is selected from H and X; with the proviso that the amine neutralizing agent comprises at last one amino group; whereby the molar ratio of the aminoalkylene phosphonic acid multiplied by the number of phosphonic acid moieties in the phosphonic acid to the molar ratio of amine multiplied by the number of N in the amine is from: 1: 0.25 to 1: 1, with the proviso that the amine neutralizing agent is represented by a combination of, at least, two structurally different amine species, the first one being more hydrophobic having a HLB value which is at least 2 units smaller than the HLB value of the second, and the second one being more hydrophilic than the first one, said first and said second amine species being used in equivalent proportions of first more hydrophobic: second more hydrophilic in the range of from 10 : 1 to 2: 5.

2. The method in accordance with claim 1 wherein the first species of the amine neutralizing agent has a HLB value which is at least 4 units smaller than the HLB value of the second species.

3. The method in accordance with claim 1 wherein the equivalent ratio of first, more hydrophobic, to second, more hydrophilic, amine species is in the range from 10:3 to 1:2.

4. The method in accordance with claim 1 wherein the neutralizing binary amines are selected from the group consisting ethylene diamine; diethylene triamine; triethylene tetramine; tetraethylene pentamine; hexamethylene diamine; dihexamethylene triamine; 1,3-propane diamine N,N'-bis(2-amino ethyl); polyether amine; polyether polyamines; amine and poly amine alkoxylates or polyalkoxylates; cocodiamine ethoxylate; 2-chloroethyl amine; 3-chloropropyl amine; 4-chlorobutyl amine; poly-amines with C$_1$-C$_{50}$ linear or branched or cyclic hydrocarbon chains; morpholine; n-butylamine; isopropyl amine; diisopropyl amine; di-n-butylamine; tri-n-butylamine; tri-isobutyl amine; cyclohexyl amine; cycloheptylamine; cyclododecylamine; 4-methylcyclohexylamine; N,N-dimethylcyclohexylamine; 1,2-cyclohexane diamine; isophoron diamine; laurylamine; stearyl amine; oleyl amine; polyvinyl amines; polyethylene imines, and mixtures of linear and/or branched polyethyleneimines; ethanolamine; diethanolamine; propanolamine; dipropanol amine; aniline; diaminotoluenes; diphenylalanine; N-phenylbenzamine; C$_6$-C$_{22}$ hydrogenated tallow alkyl amine, cocoalkyl amine and soyaalkylamine.

5. The method in accordance with claim 1 wherein the binary amine species, expressed in mole(s), are selected from the group consisting of combinations as follows:

| | |
|---|---|
| isopropylamine/tri-n-butylamine | 3/2; |
| 1,2-diaminocyclohexane/stearylamine | 0.95/1.10; |
| diethanolamine/dodecylamine | 2/5.5; |
| cyclohexylamine/tridecaneoxyethylethanolamine | 3/2.5; |
| ethanolamine/laurylamine | 2/4; and |
| triethanolamine/tri-n-butylamine | 2/10. |

6. The method in accordance with claim 1 wherein the percentage of the free P—OH in the phosphonate to be injected represents less than 90% of the total P—OH functionalities in the non-neutralized phosphonic acid, 100%.

7. The method in accordance with claim 1 whereby the molar ratio of the aminoalkylene phosphonic acid multiplied by the number of phosphonic acid moieties in the phosphonic acid to the molar ratio of amine multiplied by the number of N in the amine is from 1:0.5 to 1:0.8.

8. The method in accordance with claim 1 wherein the percentage of the free P—OH in the phosphonate injected represents less than 70% of the total P—OH functionalities in the non-neutralized phosphonic acid.

9. The method in accordance with claim 1 wherein the reservoir system comprises a water injection well and wherein an amine phosphonate aqueous solution of from 0.1 to 800 ppm of amine phosphonateis formed upon the combination of aminoalklene phosphaonic acid and the amine neutralizing agent and is continuously injected into a water injection well.

10. The method in accordance with claim 1 wherein the reservoir system comprises a well bore and wherein an aqueous solution containing from 100 to 100,000 ppm of amine phosphonate is formed upon the combination of aminoalkylene phosphaonic acid and the amine neutralizing agent and is injected into the reservoir system through a well-bore.

11. A method of use of the combination of an aminoalkylene phosphonic acid and an amine neutralizing agent of claim 1 whereby a phosphonate is formed, in secondary oil recovery, comprising the step of depositing the combination into the reservoir system which comprises a rock surface area onto which the phosphonate will diffuse before being converted, in situ, into the corresponding medium insoluble scale inhibitor which by means of gradual release into the medium provide a continuous supply of scale inhibitor in said system.

* * * * *